Patented Apr. 30, 1940

2,198,827

UNITED STATES PATENT OFFICE 2,198,827

PRODUCTION OF DIAZOTYPE LIGHT-SENSITIVE LAYERS

Werner Paul Leuch, London, England, assignor to Eugene Dietzgen Co., Chicago, Ill., a corporation of Delaware No Drawing. Application October 30, 1939, Serial No. 301,953. In Great Britain September 20, 1938

2 Claims. (Cl. 95—7)

The present invention relates to the manufacture of diazotype printing materials and has for its object the production of light-sensitive layers which are particularly suitable for development with acid developers of the type described in British Patent No. 425,235.

According to the present invention light-sensitive layers which are suitable for development with acid developers containing phloroglucinol alone as coupling component or in admixture with other coupling components and which have very good keeping qualities can be made by the use of diazo compounds derived from amines having the following structural formula:

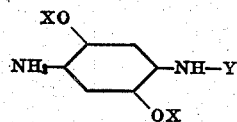

wherein X represents an aliphatic radicle and Y represents an aliphatic acyl group so that the total number of C atoms in Y and in one X group is not less than 5.

These diazo compounds have high sensitiveness to light, bleach out very well and on development with phloroglucinol they produce sharp green-black lines from both pencil and ink drawings. The finished prints possess a white background which is for all practical purposes permanently stable and does not oxidise on exposure to light and air.

Preferably Y represents the acetyl group COCH₃, in which case X represents an isopropyl group or a group containing 4 or more C atoms. It is found in the case where Y is acetyl that if X represents n-propyl, ethyl or methyl, the compounds are not suitable as their coupling energy is too low and the dye produced with phloroglucinol as coupling component bleeds when developed in acid medium.

Example

Paper is coated with the following solution and dried:

| | |
|---|---|
| Water___cubic centimeters__ | 1000 |
| Zinc chloride double salt of the diazo compound obtained by diazotising 4-amino-1-acetyl-amino - hydroquinone-di - butyl-ether___grams__ | 35 |
| Tartaric acid___do___ | 18 |
| Aluminium sulphate___do___ | 10 |

After exposure to light under a drawing and development with a developer containing:

| | Grams |
|---|---|
| Phloroglucinol | 2.1 |
| Resorcinol | 0.1 |
| Tartaric acid | 2 |
| Sodium tartrate | 5 |
| Sodium formate | 60 |
| Sodium benzoate | 15 | in 565 cc. water copies with a good white background and greenish-black, sharp lines are obtained. Paper made with the above sensitizing solution will keep in storage for many months and possesses a high degree of light-sensitiveness.

Similar results are obtained if the corresponding isopropyl compound is used. Compounds with slightly higher coupling energy and giving greener shades are obtained if the butyl groups are replaced by carbon chains having more than four C-atoms.

These new light-sensitive diazo compounds can be obtained by the usual methods, i. e. by producing the desired hydroquinone-ether, nitrating the latter, then reducing with iron and an acid, for instance HCl, isolating the base and acetylating with acetic anhydride, nitrating again in acetic acid solution and reducing with a suitable reducing agent such as zinc dust or iron and HCl, isolating the base, diazotising and precipitating the diazo compound with zinc chloride and sodium chloride. Another procedure is to nitrate and then reduce the hydroquinone-ether, and couple the latter with a suitable diazo-compound such as diazotised sulphanilic acid, and then split the dyestuff obtained and isolate the base, which after purifying is then ready for diazotising.

What I claim and desire to secure by Letters Patent is:

1. An article of manufacture for use in the production of diazotype prints comprising a base having thereon a light-sensitive layer comprising a diazo compound of an amine having the following structural formula:

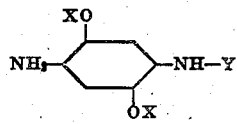

wherein Y represents an acetyl radical and X represents an aliphatic radical of the group consisting of the isopropyl radical and lower aliphatic radicals containing more than three carbon atoms.

2. An article of manufacture for use in the production of diazotype prints comprising a base having thereon a light-sensitive layer comprising a diazo compound of an amine having the following structural formula:

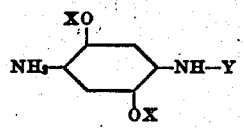

wherein Y represents an aliphatic acyl group and X represents an aliphatic radical of the group consisting of the isopropyl radical and lower aliphatic radicals containing more than three carbon atoms.

WERNER PAUL LEUCH.